(12) United States Patent
Kim et al.

(10) Patent No.: US 8,825,803 B2
(45) Date of Patent: *Sep. 2, 2014

(54) SYSTEMS AND METHODS FOR INTEGRATING XML SYNDICATION FEEDS INTO ONLINE ADVERTISEMENT

(75) Inventors: Peter H. I. Kim, Pasadena, CA (US); Hyo Lee, Pasadena, CA (US)

(73) Assignee: Interpols Network, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,513

(22) Filed: Jun. 19, 2012

(65) Prior Publication Data

US 2012/0323706 A1 Dec. 20, 2012

Related U.S. Application Data

(63) Continuation of application No. 12/715,336, filed on Mar. 1, 2010, now Pat. No. 8,204,961, which is a continuation of application No. 11/469,630, filed on Sep. 1, 2006, now Pat. No. 7,673,017.

(60) Provisional application No. 60/714,382, filed on Sep. 6, 2005.

(51) Int. Cl.
*G06F 15/16* (2006.01)

(52) U.S. Cl.
USPC .......................................... 709/218; 709/219

(58) Field of Classification Search
USPC .................................................. 709/218, 219
See application file for complete search history.

(56) References Cited

U.S. PATENT DOCUMENTS

| | | | |
|---|---|---|---|
| 2003/0190576 A1* | 10/2003 | Phan et al. ........................ | 433/6 |
| 2003/0212762 A1* | 11/2003 | Barnes et al. ................. | 709/219 |
| 2005/0086109 A1* | 4/2005 | McFadden et al. ............. | 705/14 |
| 2005/0108095 A1* | 5/2005 | Perlmutter ....................... | 705/14 |
| 2005/0216342 A1* | 9/2005 | Ashbaugh ........................ | 705/14 |
| 2005/0222903 A1* | 10/2005 | Buchheit et al. ................ | 705/14 |
| 2006/0053048 A1* | 3/2006 | Tandetnik ........................ | 705/14 |
| 2006/0217126 A1* | 9/2006 | Sohm et al. .................... | 455/454 |
| 2006/0288087 A1* | 12/2006 | Sun ............................... | 709/218 |
| 2009/0018920 A1* | 1/2009 | Lerman et al. .................. | 705/14 |

OTHER PUBLICATIONS

United Stated District Court Central District of California, SACV 12-00832 JVS (JPRx), *Interpols Network Inc.* v. *Aura Interactive Inc., et al.*, Document 56, Jun. 7, 2013, pp. 1-24, Page ID #723, United States District Court, Central District of California.

* cited by examiner

*Primary Examiner* — Krisna Lim

(74) *Attorney, Agent, or Firm* — Procopio, Cory, Hargreaves & Savitch LLP; Noel C. Gillespie

(57) ABSTRACT

A system for providing XML syndication content to an Internet advertisement panel rendered in a web browser is disclosed. The system includes a web content server, an Internet advertisement server, and a XML syndication content feed site server. Both the web content server and the Internet advertisement servers are in communications with the web browser. The web content server is configured to respond to requests from the web browser for a web page and to deliver the web page to the web browser. The Internet advertisement server is configured to choose and deliver an Internet advertisement panel, having embedded XML syndication content, to the web browser. The XML syndication content feed site server is in communications with the Internet advertisement server and is configured to send XML syndication content updates to the Internet advertisement server.

24 Claims, 8 Drawing Sheets ural feeds embedded within, that can be delivered by the servers illustrated in FIG. 1 in accordance with another embodiment;

SYSTEMS AND METHODS FOR INTEGRATING XML SYNDICATION FEEDS INTO ONLINE ADVERTISEMENT

APPLICATIONS FOR CLAIM OF PRIORITY

This application claims the benefit of U.S. patent application Ser. No. 12/715,336 filed on Mar. 1, 2010, now U.S. Pat. No. 8,204,961, which in turn claims the benefit of U.S. patent application Ser. No. 11/469,630, filed Sep. 1, 2006, now U.S. Pat. No. 7,673,017, which in turn claims the benefit of U.S. Provisional Application No. 60/714,382 filed Sep. 6, 2006. The disclosure of the above-identified applications are incorporated herein by reference.

BACKGROUND

1. Field of the Invention

The embodiments disclosed in this application generally relate to internet advertising and more specifically to integration of XML syndication content into Internet advertising.

2. Background of the Invention

Extensible Mark-up Language or XML is a web document specification that uses tags to describe the contents of a field. It is very similar to Hypertext Markup Language (HTML), but unlike HTML it allows designers to create their own customized tags, enabling the definition, transmission, validation, and interpretation of data between applications and between organizations. Several families of XML-based formats are routinely used by webmasters to create files containing web content (e.g., news headlines, summaries of specific information, audio files, video files, etc.) for syndication across the Internet. Examples of these families of XML syndication formats are RSS and Atom. Of the two families, RSS is the most widely used because of its simplicity for developers.

Typically, syndicated content is delivered in the form of syndication feeds that are subscribed to directly by users with aggregators or feed readers, which combine the contents of multiple web content feeds for display on a single screen or a series of screens. Depending on the aggregator, subscription is done by manually entering the URL of a feed, by clicking a link in a web browser or by various other methods. Newer versions of many popular web browsers tend to include built-in aggregator features, thus negating the need for a user to subscribe to an aggregator or feed reader.

While the majority of XML syndication feeds currently contain news headlines or breaking information, the long term uses of XML syndication feeds are more diverse. For example, the feeds can be used by Internet advertising companies to interactively deliver Internet content to consumers, to seamlessly integrate dynamically updated content with Internet advertising media, and to deliver dynamically updated data (e.g., statistics, results, etc.) to consumers.

Currently, there is no way to fully realize the potential long-term uses for XML syndication feeds in Internet advertising. For example, there are insufficient means to integrate XML syndication feeds with Internet advertising to dynamically deliver a more content rich experience to consumers.

SUMMARY

Methods and systems for integrating XML syndication content with Internet advertising.

In one aspect, a system for providing XML syndication content to an Internet advertisement panel rendered in a web browser is disclosed. The system includes a web content server, an Internet advertisement server, and a XML syndication content feed site server. Both the web content server and the Internet advertisement servers are in communication with the web browser. The web content server is configured to respond to requests from the web browser for a web page and to deliver the web page to the web browser. The Internet advertisement server is configured to choose and deliver an Internet advertisement panel, having embedded XML syndication content, to the web browser. The XML syndication content feed site server is in communication with the Internet advertisement server and is configured to send XML syndication content updates to the Internet advertisement server.

In another aspect, a method for providing a dynamically updated Internet advertisement panel to a remote user is disclosed. A request for the Internet advertisement panel is received. Archived information is searched regarding previous communications with the remote user and the Internet advertisement panel is selected based on previous communications with the remote user. The selected Internet advertisement panel is created and XML syndication content configured to allow for updates is embedded into the Internet advertisement panel. The selected Internet advertisement panel is sent to the remote user in a format that permits the remote user to view and interact with the selected Internet advertisement panel. A profile for the remote user is updated with information about the selected Internet advertisement panel and then archived in a storage area.

In still another aspect, a method for updating XML syndication content in an Internet advertisement panel is disclosed. XML syndication content data is received from a XML syndication content feed site server. The XML syndication content is stored in a storage area. The XML syndication content data to include in the XML syndication content update file is chosen in accordance with a set of criteria. An Internet advertisement panel with the XML syndication content update file embedded within is created. The Internet advertisement panel is sent to a remote client hosting the Internet advertisement panel.

These and other features, aspects, and embodiments of the invention are described below in the section entitled "Detailed Description."

BRIEF DESCRIPTION OF THE DRAWINGS

For a more complete understanding of the principles disclosure herein, and the advantages thereof, reference is now made to the following descriptions taken in conjunction with the accompanying drawings, in which.

DETAILED DESCRIPTION

Figure 1:
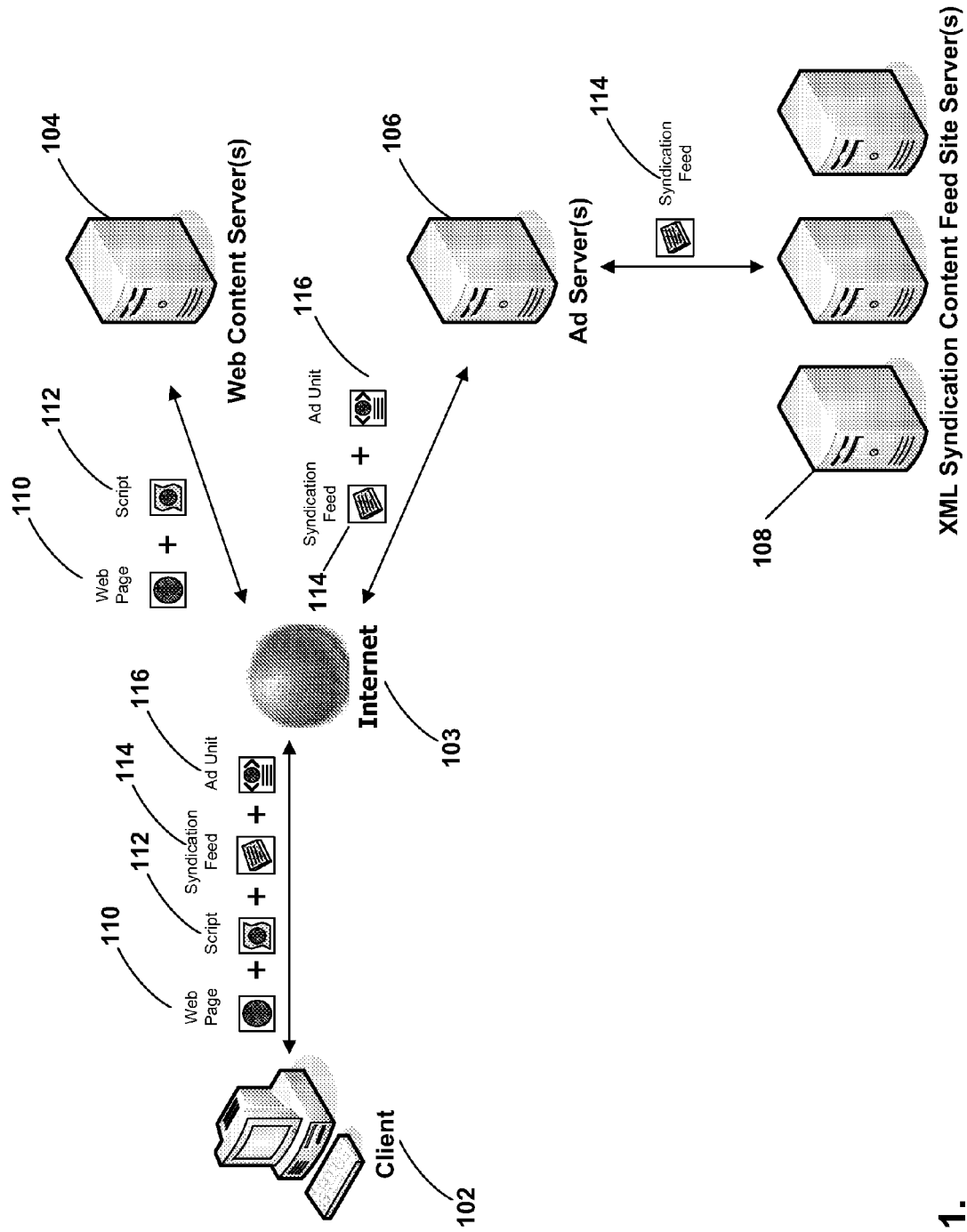
FIG. 1 is a diagram illustrating multiple Internet content servers working collaboratively to deliver Internet advertising and XML-based syndication content to a client in accordance with one embodiment.

An invention is described for methods and systems for integrating XML syndication content with Internet advertising. It will be obvious, however, that the present invention may be practiced without some or all of these specific details. In other instances, well known process operations have not been described in detail in order not to unnecessarily obscure the present invention.

As used herein, the Internet or World Wide Web (WWW) uses a hypermedia-based system for enabling the browsing of Internet sites. As its name implies, the WWW (i.e., Internet) is made of many websites linked together allowing users to travel from one website to another simply by clicking on hyperlinks. To access the web, a user (i.e., client) typically runs a web browser program (e.g., Firefox™, NetScape™, Internet Explorer™, etc.) that assists the user in navigating from among the various websites on the WWW and renders the web pages associated with those websites for viewing by the user.

As discussed above, RSS is a family of XML-based formats that includes many competing variants developed by different groups throughout its development. A quick summary of those variants and their definitions of what the RSS acronym stands for include: RDF Site Summary (RSS v. 0.90, v. 1.0, and v. 1.1), Rich Site Summary (RSS v. 0.91), and Really Simple Syndication (RSS v. 2.0 and RSS v. 3.0). It should be appreciated that these are just some examples of RSS formats and are not meant to limit the types of RSS formats available for the present invention. Essentially any RSS type format can be used as long as the format is XML based. Atom refers to Atom Syndication Format (used mainly for web content syndication feeds) or Atom Publishing Protocol (used mainly as a simple HTTP-based protocol for creating and updating Web resources).

In one embodiment, the XML syndication content feed is integrated as a sub-panel within an Internet advertisement panel. Using this configuration, the feed sub-panel containing the XML content feed(s) can be worked into a variety of sizes and be placed at any location within the advertisement panel by the advertisement server administrator. In another embodiment, the XML syndication content feed can be integrated as a hidden feed display panel within the Internet advertisement panel. In this configuration, the feed display panel is revealed only when a mouse pointer is placed over the Internet advertisement panel. It should be appreciated, however, that the integration methods described above are only examples of ways in which a XML syndication content feed can be integrated with an Internet advertisement panel. In practice, the XML syndication content feed can be integrated with the advertisement panel in any configuration as long as the XML content feed can be effectively delivered and understood by a user viewing the content feed.

In view of the foregoing, it should therefore be fully appreciated that a variety of Internet based content (i.e., Internet advertising, news, etc.) can benefit from the systems and methods described herein.

FIG. 1 is an illustration of how multiple Internet content servers can work collaboratively to deliver Internet advertising and XML-based syndication content to a client, in accordance with one embodiment of the systems and methods described herein. As depicted, a client 102 using a web browser is in communications by way of the Internet 103 with a web content server 104, an ad server 106, and a XML syndication content feed site server 108. It should be appreciated that the client 102 can be in communications with multiple servers of each server type (e.g., web content server 104, ad server 106, etc.) and that single servers were used in this depiction for the sake of simplicity and is not intended to limit the scenario to single servers of each server type.

The XML syndication content feed site server 108 may be connected to the ad server 106 by way of the Internet 103, a local area network connection, or any equivalent thereof. During an Internet 103 web surfing session, the client 102 makes a request for a web page 110 from the web content server 104, which then sends the requested page 110 back to the client 103 in the form of a Hyertext Markup Language (HTML) or equivalent type file, e.g., XML, Extensible Hypertext Markup Language (XHTML), and Extensible Bindings Language (XBL). Embedded within the web page 110 is a script 112 that instructs the clients' 102 web browser to send a request for advertisement panels to be sent from the ad server 106 to the client 102. Examples of programming languages that can be used to create the script 112 include, JAVASCRIPT™ and VBSCRIPT™. It should be understood, however, that the script 112 can be created using any programming language as long as the script 112 can be processed by the clients' 102 web browser to initiate a request for an advertisement panel from the ad server 106.

Still with FIG. 1, in one embodiment, once the request is received, the ad server 106 is configured to search file(s) containing the previous communications history with the client 102 to choose an appropriate advertisement unit 116 to return back to the client 102. Examples of historical information that may impact the advertisement units 116 chosen include: information about which advertisement units 116 have already been sent to the client 102, information regarding client 102 response to those previous advertisements 116, and client 102 demographics information. In another embodiment, once the request is received, the ad server 106 is configured to choose an advertisement unit 116 to send based on the web content server 104 that the client 102 was in communications with prior to the creation of the request.

A syndication feed 114 is embedded into the ad unit 116 prior to the ad server 106 sending the ad unit 116 to the client 102. In one embodiment, the syndication feed 114 is created using a RSS-based format such as RDF Site Summary, Rich Site Summary, or Really Simple Syndication. In another embodiment, the syndication feed 114 is created using an Atom-based format such as the Atom Syndication Format (ASF). It should be appreciated that the syndication feed 114 can be created using any XML-based format as long as the XML syndication feed 114 can be embedded into an advertisement unit 116 and rendered by a web browser.

Continuing with FIG. 1, the types of content that can be delivered by the syndication feed 114 is diverse and may include text, pictures, audio, and video elements. The various content delivered by the feed 114 generally relate to a particular subject matter that may or may not be relevant to what is being marketed in the advertisement unit 116. In one embodiment, the contents of the XML syndication feed 114 relate to the subject of the advertisement unit 116 itself. For example, if the advertisement unit 116 is marketing a new car model, the XML feed 114 may be a poll that queries the client 102 about a preferred car make or model. In another embodiment, the content of the XML syndication feed 114 is chosen based on the client's 102 interactions with the advertisement unit 116. For example, a client 102 using a mouse to click on an object or character depicted in the advertisement unit 116 may result in a XML syndication feed 114 providing news or information about the object or character. Examples of programming languages that can be used to create advertisement units 116 that enable interactions with the user include JAVA-SCRIPT™, VBSCRIPT™, ACTIVEX™, or FLASH™. It should be understood, however, that any programming language can be used to create interactive advertisement units 116 as long as the resulting unit 116 can be delivered through the Internet 103 and be processed by a web browser.

In one embodiment, the XML site server 108 is configured to send XML syndication content feed(s) 114 to the ad server 106, which provides temporary cache storage of the XML syndication feed 114 before sending the feed 114 to the client 102 via the Internet 103. These syndication content feed(s) 114 are dynamically updatable In one embodiment, the XML site server 108 is configured to send XML content feed 114 updates to the ad server 106 in accordance to a set interval schedule. For example, the XML site server 108 can be programmed to send the updates according to a time based interval (e.g., minutes, hours, etc.) schedule. In another embodiment, the XML site server 108 is configured to send content 114 updates anytime new syndication content 114 becomes available. For example, the XML site server 108 can be programmed to send a XML content feed 114 update whenever a new hyperlink is added to the content feed 114. In still another embodiment, the XML site server 108 is configured to send XML content feed 114 updates to the ad server 106 whenever the XML site server 108 receives a request for updated XML content from the ad server 106. The request may be self-initiated by the ad server 106 in accordance with a set interval schedule or may be in response to a request sent by the client 102.

Figure 2:
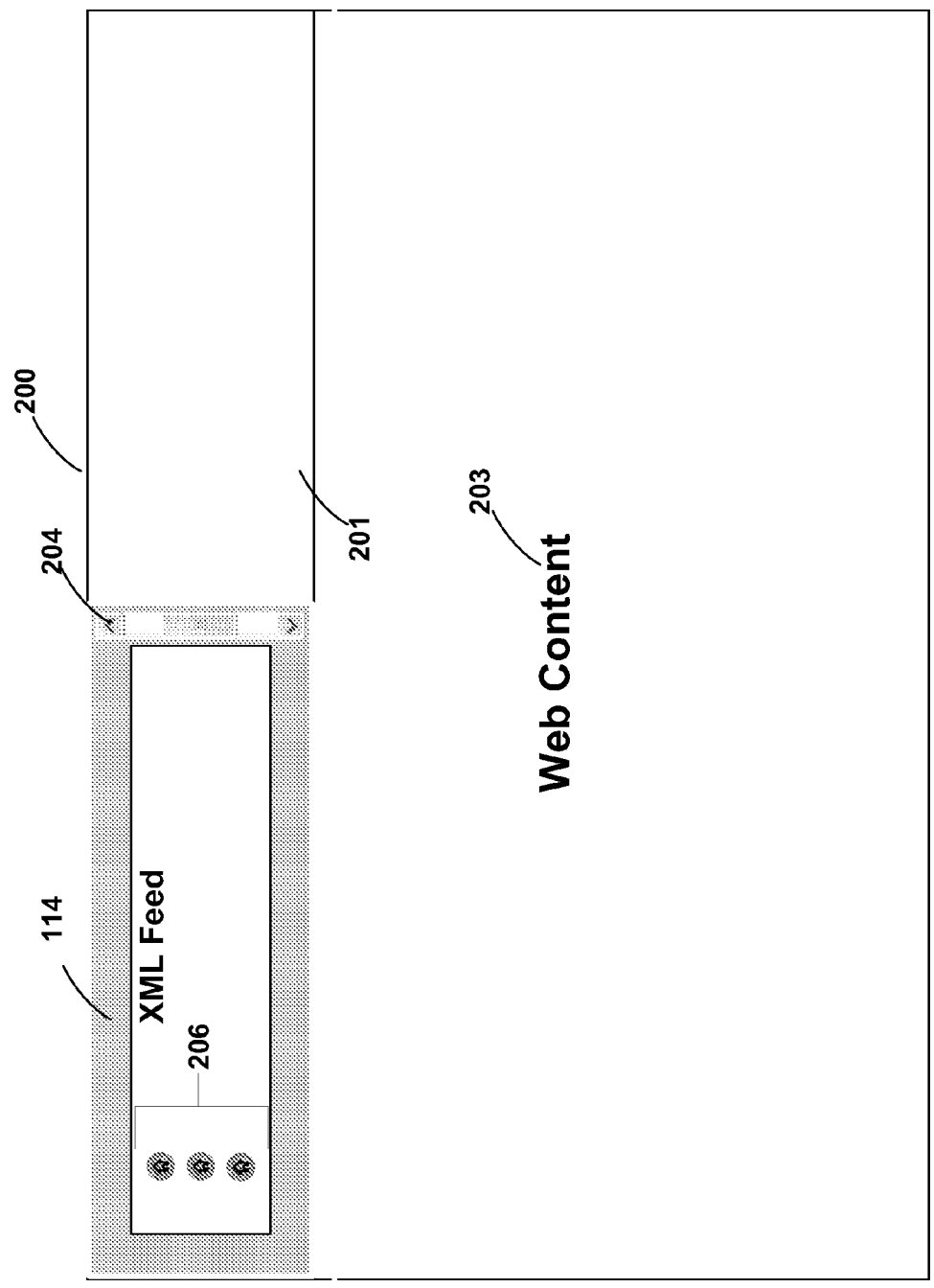
FIG. 2 is a diagram illustrating a web browser window that includes an advertisement unit with a XML syndication feed embedded within, that can be delivered by the servers illustrated in FIG. 1 in accordance with one embodiment.

FIG. 2 is an illustration of a web browser window that includes an advertisement unit with a XML syndication feed embedded within, in accordance with one embodiment. As shown herein, the browser window 200 includes an Internet advertising unit 201 that is positioned above web content 203 in the browser 200. The advertising unit 201 includes an embedded XML content feed 114 within its boundaries. The XML syndication feed 114, as depicted herein, has a plurality of hyperlinks 206 each linked to specific web content 203 by way of a Universal Resource Locator (URL) address set within the hyperlink 206. It should be appreciated, however, that the XML content feed 114 may contain any type of web content (i.e., text, images, video, etc.) 203 as long as the content 203 can be displayed by the browser 200 hosting the feed 114. In one embodiment, a text summary detailing the specifics of the web content that each hyperlink 206 is associated with is positioned adjacent to each of the hyperlinks 206. In another embodiment, a summary of the web content 203 associated with each hyperlink 206 becomes visible to the user when a mouse pointer is positioned substantially over the hyperlink 206.

By using a scroll bar 204, the user can scroll through the entire list of hyperlinks 206 available to the XML syndication feed 114. Each hyperlink 206 may be associated with web content 203 that may be in the same or in different formats (e.g., text, multimedia, etc.). Examples of web content 203 that can be connected via the hyperlinks 206 include: news stories, video feeds, product purchases, product information, sales, and marketing promotions. It should be understood that any web content 203 can be connected by hyperlinks 206 added to the XML syndication feed 114 as long as the content 203 can be accessed over the Internet and the content 203 format is supported by the web browser 200 hosting the syndication feed 114.

Continuing with FIG. 2, as discussed in detail above, one significant advantage of delivering content using a XML syndication feed 114 is that the web content 203 can be continuously updated via the XML syndication content site servers that are connected to the ad server sending the advertisement unit 201 to the client browser 200. This allows for a virtually constant stream of new web content delivered to a user and for tailored content to be delivered to the user to advance the objectives of the Internet marketing campaign.

Figure 3:
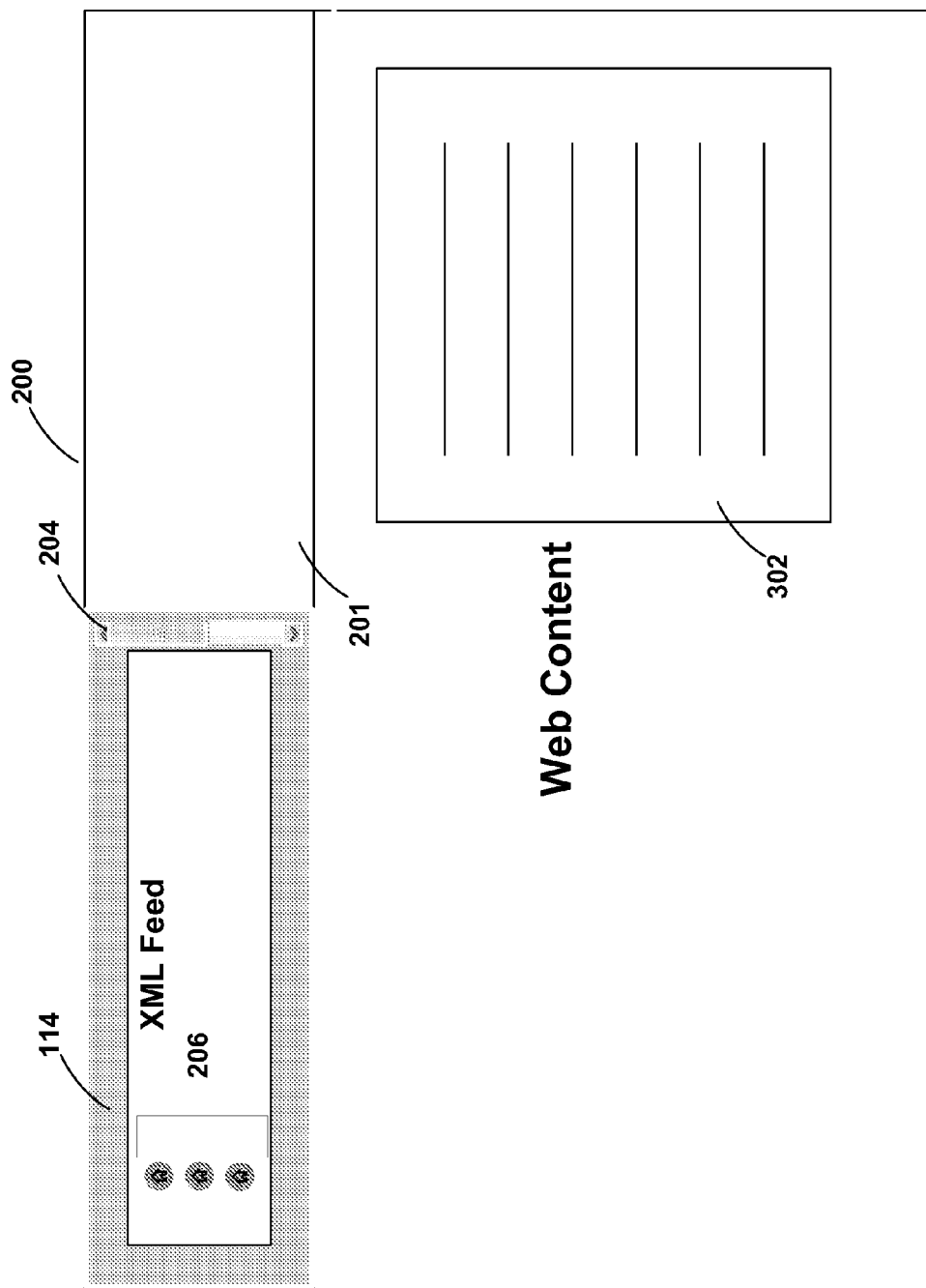
FIG. 3 is a diagram illustrating the results when a hyperlink in the XML syndication feed for FIG. 2 is selected by the user during a web session.

FIG. 3 is an illustration of what results when a hyperlink in a XML syndication feed embedded within an advertisement unit is selected by a user during a web session, in accordance with one embodiment. In this illustration, a web content window 302 opens when the user selects one of the hyperlinks 206 that are in the XML syndication feed 114 embedded within the advertisement unit 201. The content window 302 can be, for example, the news story associated with the chosen hyperlink 206. Alternatively, the content window 302 can be multimedia content (e.g., images, audio, video, etc.) related to the chosen hyperlink 206. It should be appreciated, however, that the content window 302 can be used to display essentially any type of web content associated with the hyperlink 206 as long as the content can be accessed over the Internet and the content format is supported by the web browser 200 hosting the syndication feed 114. Additionally, the web content may or may not relate directly to the subject of the chosen hyperlink 206.

Window 302 can be part of, or appear in content area 203 or, depending on the embodiment, window 302 can be a stand alone window. In such embodiments, the functionality of the content window 302 can appear the same or similar to other conventional web pages; however, as previously discussed, unlike conventional Internet advertisement units 201, the hyperlinks 206 in the XML syndication feed 114 embedded in the advertisement unit 201 described herein can be updated dynamically by a XML syndication feed site server by way of the ad server delivering the ad unit 201.

Figure 4:
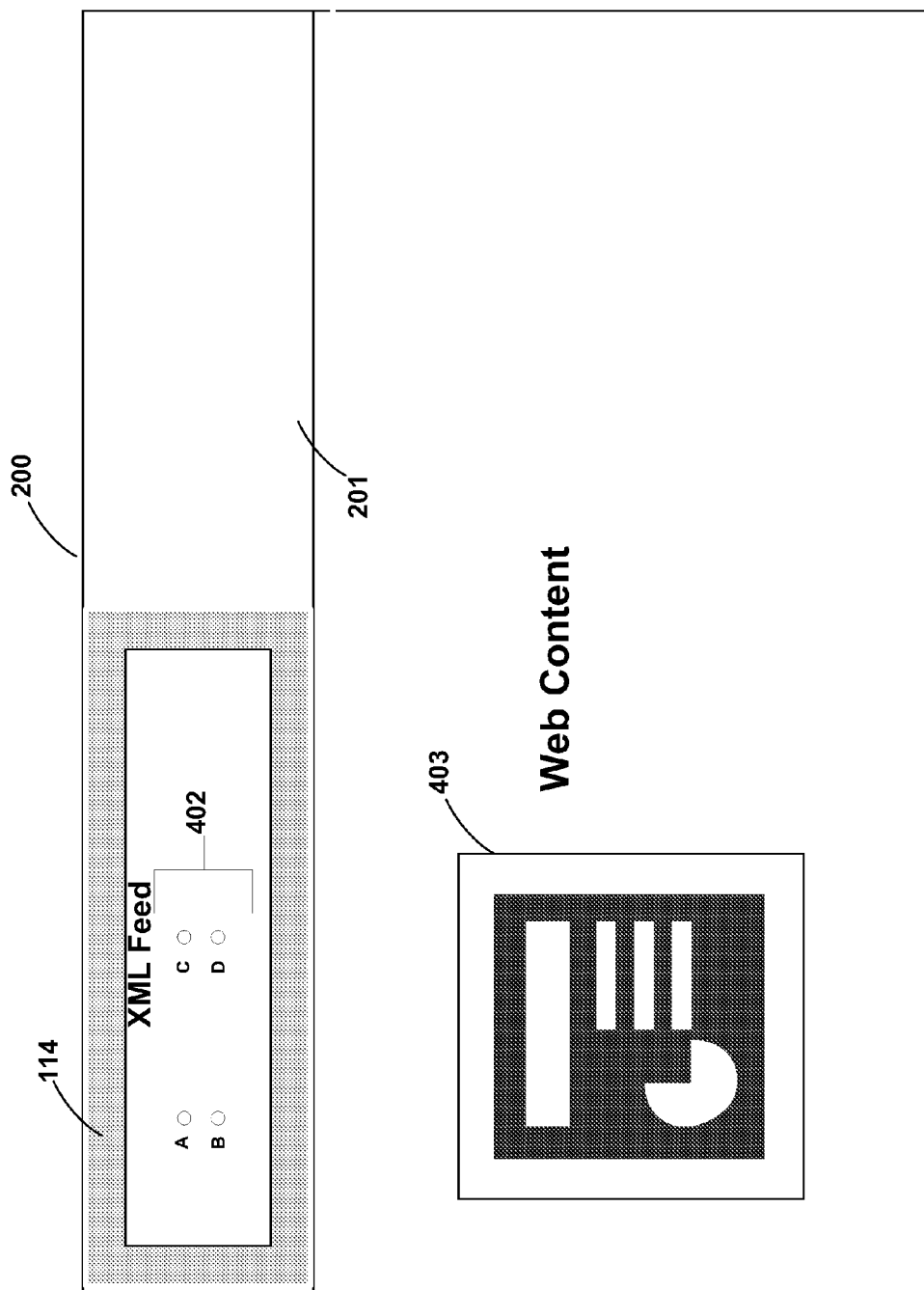
FIG. 4 is a diagram illustrating a web browser window that includes an advertisement unit with a XML syndication feed embedded within that can be delivered by the servers illustrated in FIG. 1 in accordance with another embodiment.

FIG. 4 is an illustration of a web browser window that includes an advertisement unit with a XML syndication feed embedded within, in accordance with one embodiment. In this ad unit 201, the XML syndication feed panel 114 is configured to deliver an interactive poll 402. Users can thus interact with and respond to the poll 402 that is contained within the XML feed panel 202. The poll 402 can be used to query the users' opinions about a variety of subjects that may or may not be related to the subject of the advertisement unit 201. As with the XML syndication feed panel 114 delivering hyperlinks described above, the poll 402 can be dynamically updated by a XML syndication feed site server by way of the ad server delivering the ad unit 201.

Also depicted in this illustration, is a poll results window 403 that displays the results of the interactive poll 402 after the user has interacted in some fashion with the poll 402. The interaction can be as simple as the user responding to poll 402 by choosing a box presented or it can involve multiple interactive steps such as choosing a box and additionally choosing a poll selection submission button within the poll 402. The results 403 may be in the form of numerical statistics summarizing how other users have responded to the poll 402 or just display the leading vote receiver. It should be appreciated, however, that the poll results 403 may be delivered in any format that can be delivered over the Internet and is appropriate for the particular application. In one embodiment, as with the XML syndication feed panel 202 described above, the poll results 403 can be dynamically updated by a XML syndication type feed 114.

Figure 5:
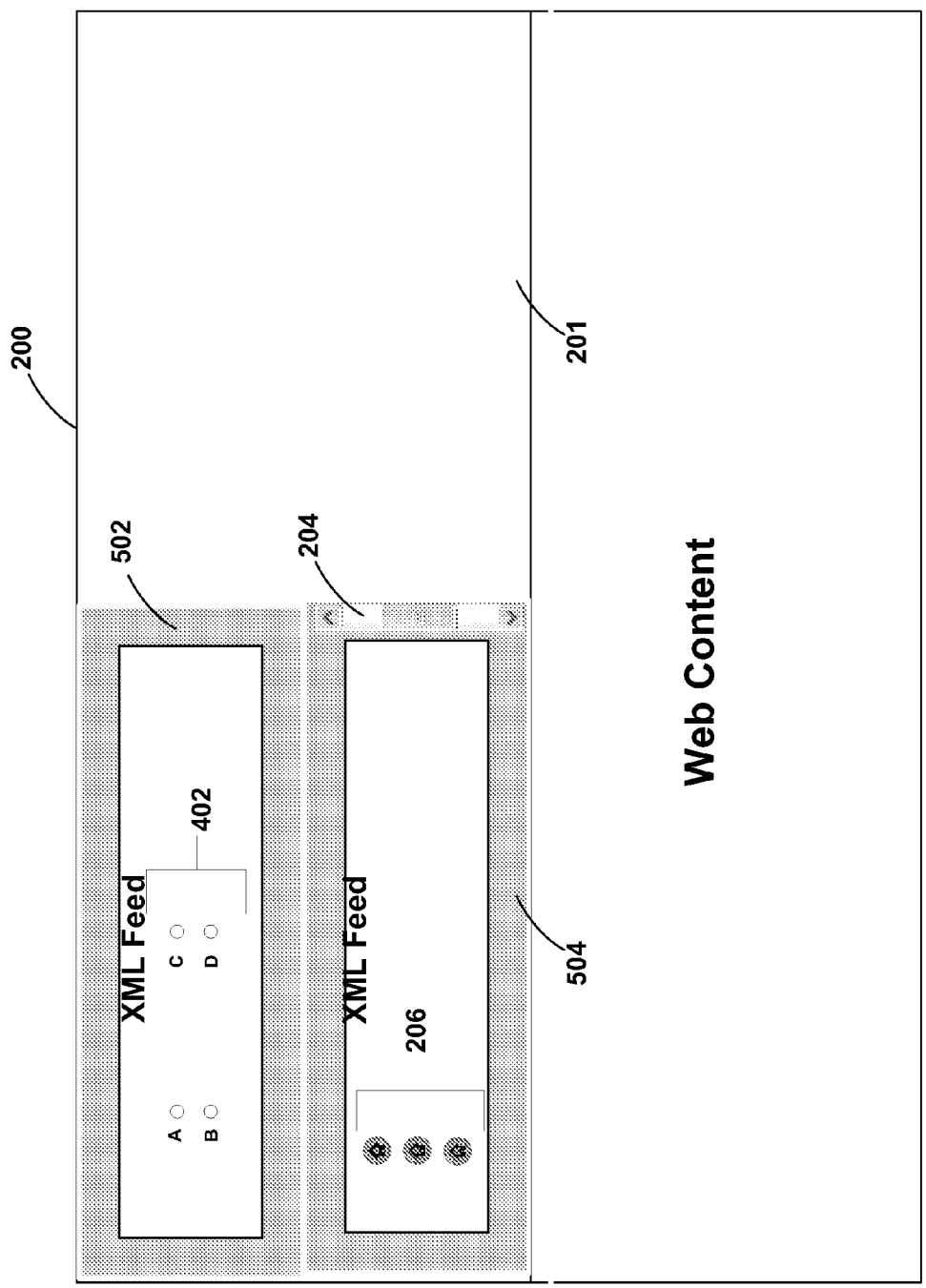
FIG. 5, is a diagram illustrating a web browser window that includes an advertisement unit with multiple XML syndication feeds embedded within that can be delivered by the servers illustrated in FIG. 1 in accordance with still another embodiment.

FIG. 5, is an illustration of a web browser window that includes an advertisement unit with multiple XML syndication feeds embedded within, in accordance with one embodiment. As depicted herein, the advertisement unit 201 includes two separate XML syndication feeds (i.e., an interactive poll feed 502 and a hyperlinks feed 504). The XML feed at the top left of the ad unit is an interactive poll feed 502. The poll feed 502 is configured to deliver dynamically updated interactive polls 402 to the ad unit 201 in the manner described above. Mainly, the interactive polls 402 are updated by one or more XML syndication feed site servers via the ad server delivering the ad unit 201. The XML feed below the interactive poll feed 502 is the hyperlinks feed 504 which delivers hyperlinks 206 associated with various web content that may or may not be related to the subject of the advertisement unit 201. As with the interactive poll feed 502, the hyperlinks feed 504 can be dynamically updated by one or more XML syndication feed site servers via the ad server sending the ad unit 201 to the browser 200.

Figure 6:
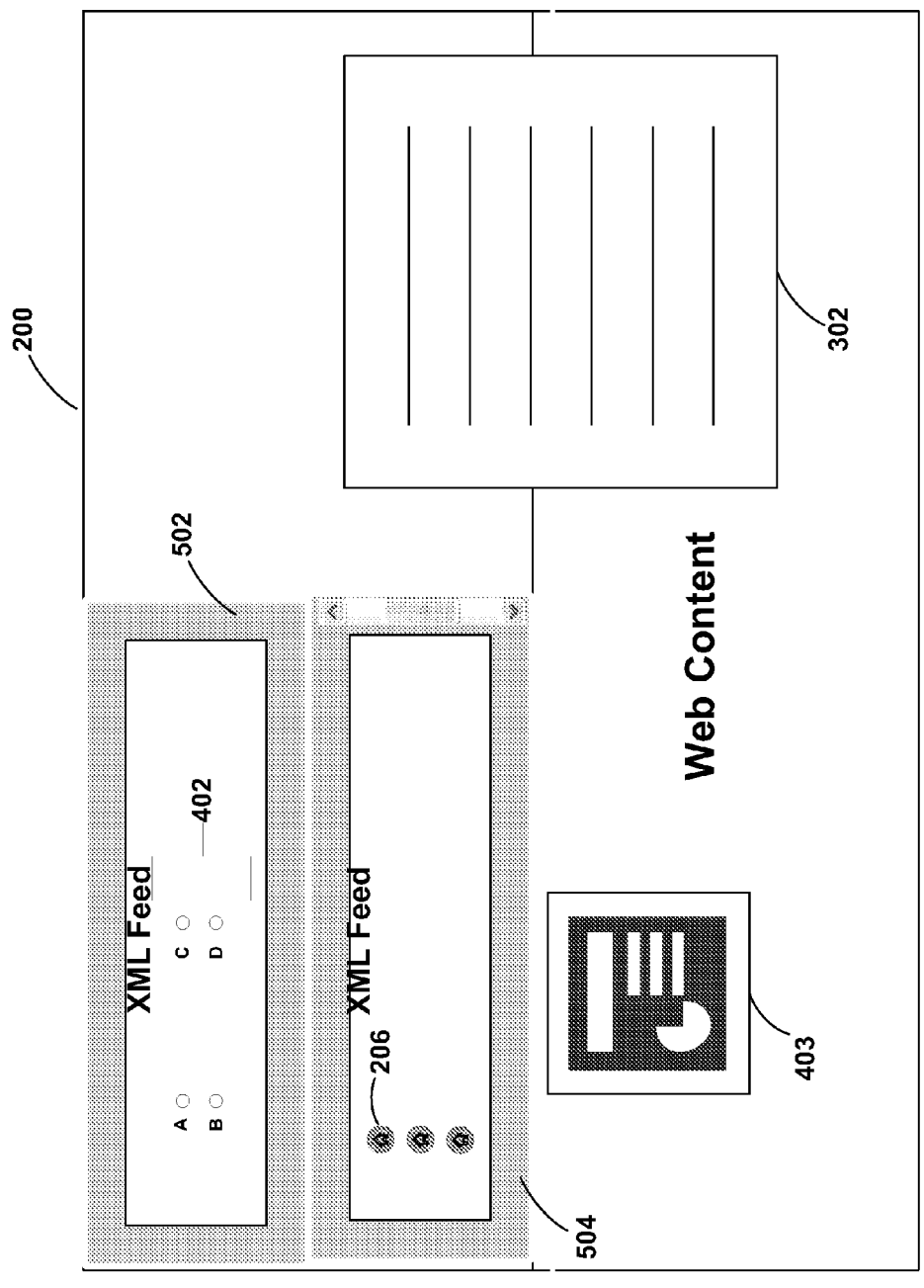
FIG. 6, is a diagram illustrating what happens when a user interacts with either an interactive poll feed or a hyperlinks feed in accordance with one embodiment.

When a user interacts with either the interactive poll feed 502 or the hyperlinks feed 504 a new window can pop-up that displays the poll results (i.e., poll results window 403) from the interactive poll 406 or the web content (i.e., web content window 302) associated with the hyperlink 206 chosen, in the manner illustrated in FIG. 6. Both the poll results window 403 and the web content window 302 can be dynamically updated by one or more XML syndication feed site servers via the ad server delivering the ad unit 201 to the browser 200 in the same manner as that described above.

It should be appreciated, that the types of XML feeds depicted herein the advertisement unit 201 are used for illustrative purposes only and should not be interpreted to limit the categories of XML feeds that can be embedded within the ad unit 201. The XML feeds can be of any type (e.g., multimedia, interactive poll, hyperlinks, text, blogs, etc.) as long as the content in the feed is adaptable to be delivered in one of the available XML-based feed formats (e.g., RSS, Atom, etc.) and can be displayed by the web browser 200 hosting the XML feed. For example, the ad unit 201 described herein FIG. 5 can just as easily be modified to include two XML feeds, one delivering multimedia content such as a video feed, and the other delivering blog content.

Figure 7:
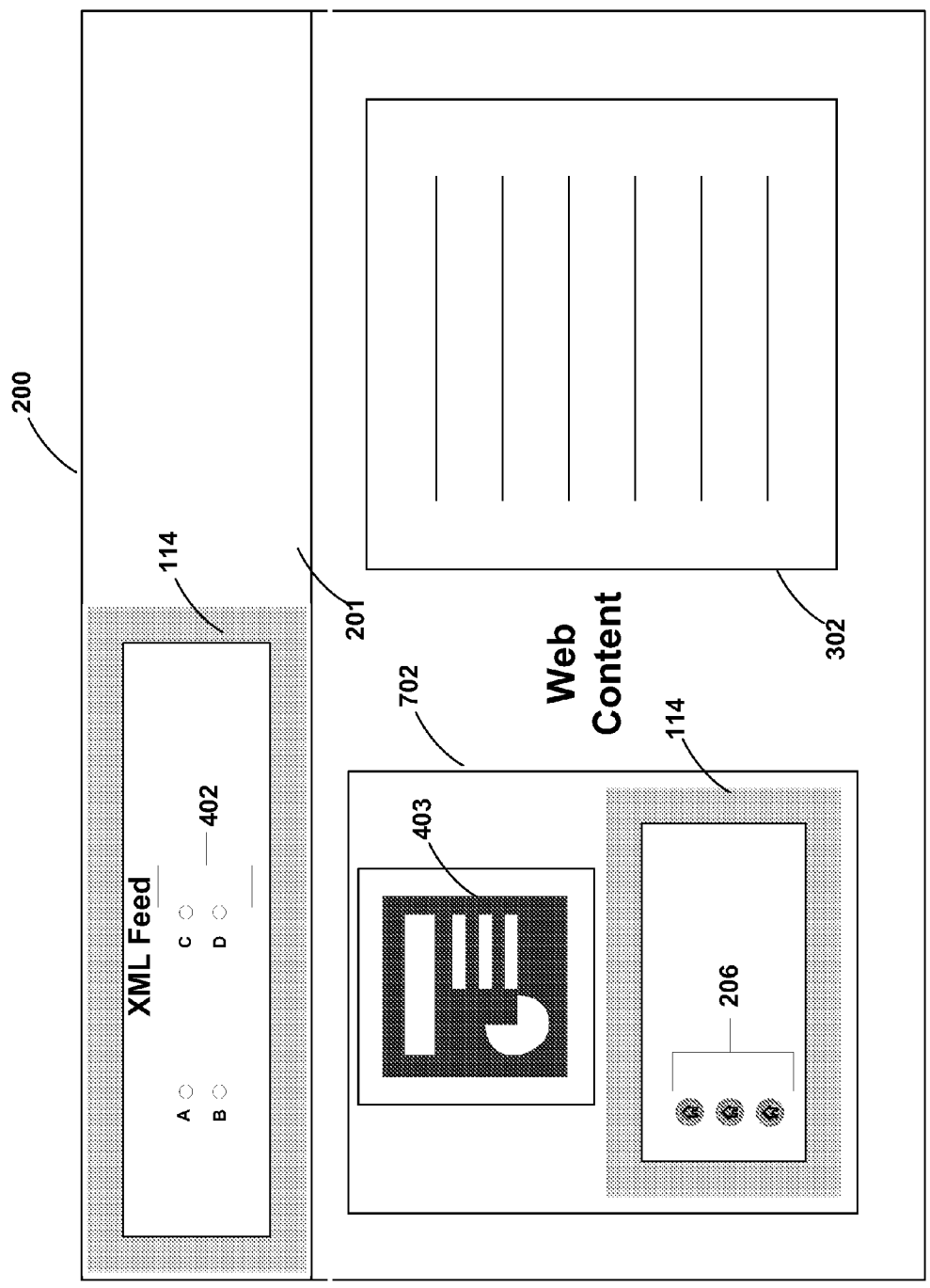
FIG. 7 is a diagram illustrating a web browser window that includes an advertisement unit with a XML syndication feed embedded within and a window displaying poll results and hyperlinks in accordance with one embodiment.

FIG. 7 is an illustration of a web browser window that includes an advertisement unit with a XML syndication feed embedded within and a window displaying poll results and hyperlinks, in accordance with one embodiment. In this embodiment, the browser window 200 includes an embedded ad unit 201 that has an XML syndication feed 114 that is configured to deliver interactive polls 402 content. When a user interacts with the interactive poll 402, a poll results/XML syndication feed window 702 pops up displaying both the poll results 403 and an additional embedded XML syndication feed 114 with hyperlinks 206 to web content that may or may not be related to the subject of the interactive poll 402.

If the user chooses to click on any one of the hyperlinks 206, a content window 302 pops up to display the web content associated with the hyperlink 206 chosen. It should be understood that the web content can essentially be any text, image, or multi-media (i.e., audio, video, etc.) content as long as it can be delivered via the Internet and be displayed by the web browser 200 hosting the advertisement unit 201. Both the XML syndication feed 114 embedded within the advertisement unit 201 and the poll results/XML syndication feed window 702 can be dynamically updated by one or more XML syndication feed site servers via the ad server in the same manner as that described above.

Figure 8:
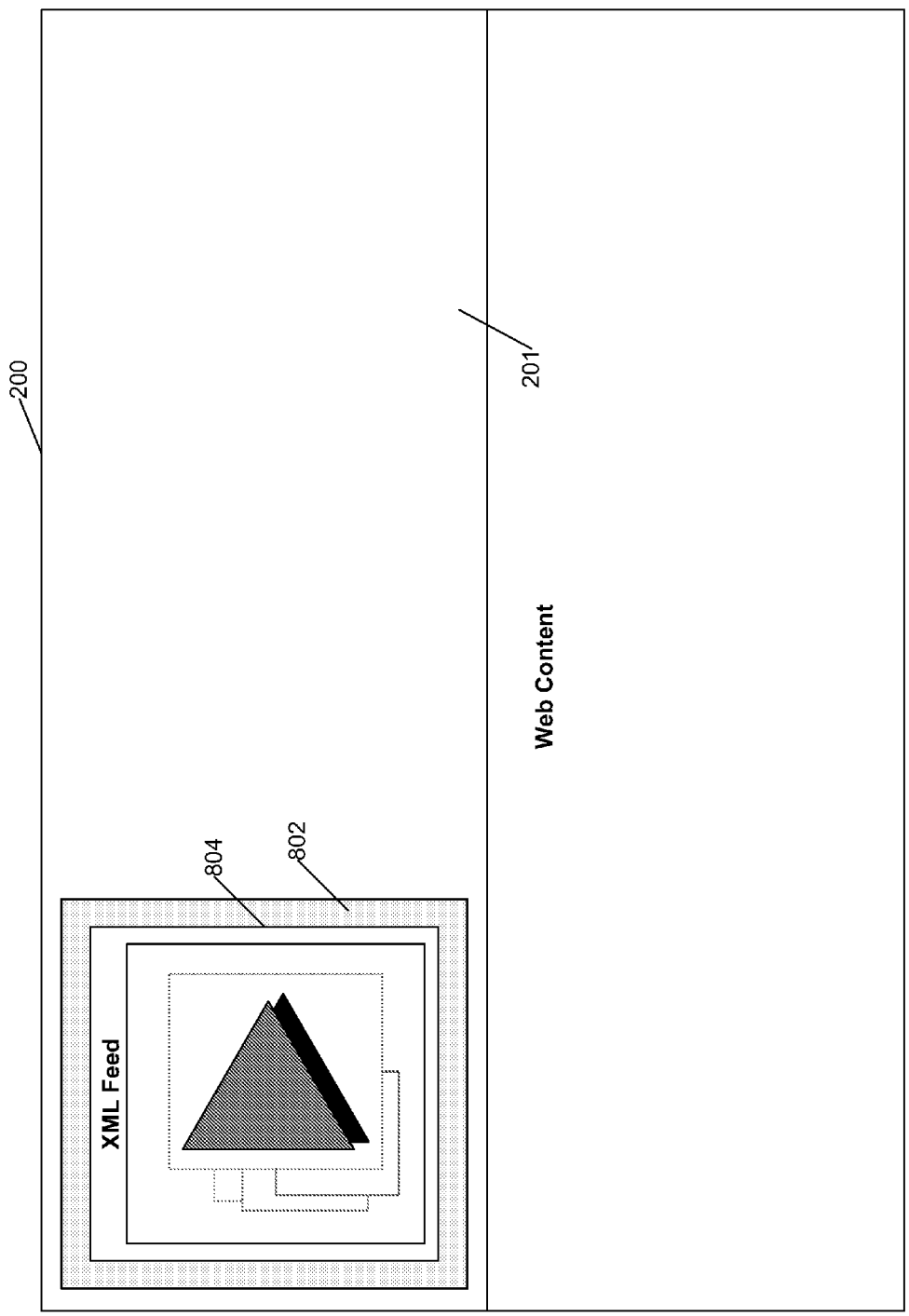
FIG. 8 is a diagram illustrating a XML multi-media feed embedded within an advertisement unit in accordance with one embodiment.

FIG. 8, is an illustration of a XML multi-media syndication feed embedded within an advertisement unit, in accordance with one embodiment. Depicted herein is a XML multi-media syndication feed 802 is embedded within an ad unit 201. The multi-media feed 802 is configured to deliver multi-media web content (e.g., audio, video, games, etc.) that can be dynamically updated by one or more XML syndication feed site servers via the ad server in the same manner as that previously discussed above. In one embodiment, the XML multi-media content feed 802 can be configured to automatically execute (i.e., play) any new multi-media content 804 that it receives from the ad server as part of a content update. In another embodiment, the multi-media content feed 802 can be configured to require a user to actively initiate the playing of any new multi-media content 804 introduced as part of an update operation.

The invention, described herein, may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A system for providing syndicated content to an Internet panel rendered in a web browser, comprising:
   a database configured to store syndicated content;
   an Internet server configured to be in communication with the web browser, the Internet server configured to choose and deliver an Internet panel to the web browser, wherein the Internet panel is chosen based on previous communications with the web browser, wherein a portion of the syndicated content stored in the database is embedded within the Internet panel; and
   a syndicated content server configured to be in communications with the web browser, the syndicated content server is configured to produce updates for the portion of the syndicated content embedded in the Internet panel;
   wherein the Internet panel is configured to receive updates from the syndicated content server without requiring user interaction with the web browser.

2. The system for providing syndicated content to an Internet advertisement panel rendered in a web browser, as recited in claim 1, and further comprising a web content server in communication with the web browser, the web content server configured to respond to requests by the web browser for a web page and to deliver the web page to the web browser, and wherein the web content server communicates with the web browser by way of an Internet connection.

3. The system for providing syndicated content to an Internet advertisement panel rendered in a web browser, as recited in claim 2, wherein the Internet server communicates with the web browser by way of an Internet connection.

4. The system for providing syndicated content to an Internet panel rendered in a web browser, as recited in claim 1, wherein the syndicated content server communicates with the web browser through an Internet connection.

5. The system for providing syndicated content to an Internet panel rendered in a web browser, as recited in claim 1, wherein the internet server includes an internal memory cache to store syndicated content communicated by the syndicated content server.

6. The system for providing syndicated content to an Internet panel rendered in a web browser, as recited in claim 1, wherein the web page contains embedded script configured to instruct the web browser to request the Internet panel from the Internet server.

7. The system for providing syndicated content to an Internet panel rendered in a web browser, as recited in claim 6, wherein the embedded script is written using a programming language that is one of JAVASCRIPT™ or VBSCRIPT™.

8. The system for providing syndicated content to an Internet panel rendered in a web browser, as recited in claim 1, wherein the web browser is configured to request updates for the portion of the syndicated content embedded in the Internet panel from the syndicated content server in accordance to a pre-determined schedule.

9. The system for providing syndicated content to an Internet panel rendered in a web browser, as recited in claim 1, wherein the updates to the portions of the syndicated content embedded in the Internet panel are created from a format that is one of RSS or Atom.

10. The system for providing syndicated content to an Internet panel rendered in a web browser, as recited in claim 9, wherein RSS is a syndication format selected from a group consisting of Really Simple Syndication (RSS 2.0), Rich Site Summary (RSS 0.91, RSS 1.0), and RDF Site Summary (RSS 0.9 and 1.0).

11. The system for providing syndicated content to an Internet panel rendered in a web browser, as recited in claim 1, wherein the portion of the syndicated content embedded in the Internet pale is selected from a group consisting of an interactive poll, a hyperlink, an image, text, a video file, an audio file, and a poll results page.

12. The system for providing syndicated content to an Internet panel rendered in a web browser as recited in claim 1, wherein the panel is chosen based on information related to what Internet panels have already been sent to the web browser.

13. The system for providing syndicated content to an Internet panel rendered in a web browser as recited in claim 1, wherein the panel is chosen based on information related to responses received from the web browser in response to an Internet panel previously sent to the web browser.

14. The system for providing syndicated content to an Internet panel rendered in a web browser as recited in claim 1, wherein the panel is chosen based on demographic information related to a client associated with the web browser.

15. A method for providing a dynamically updated Internet panel to a remote computing device associated with a remote user, comprising:
   In a database, storing syndicated content;
   In an ad server:
      receiving a request for the Internet panel,
      searching archived information regarding previous communications with the remote user, wherein the search includes selecting the Internet panel based on the previous communications with the remote user,
      creating the selected Internet panel,
      sending the selected Internet panel to the remote computing device in a format that permits the remote user to view and interact with the selected Internet panel,
      updating a profile for the remote user with information about the selected Internet-panel, and
      archiving the profile for the remote user in a storage area; and
   In a syndicated content server:
      embedding a portion of the syndicated content into the selected Internet panel, wherein the embedded portion of the syndicated content is configured to allow for automatic updates.

16. The method for providing a dynamically updated Internet panel to a remote user, as recited in claim 15, further including, creating the profile for the remote user before updating if there is no archived information regarding the remote user.

17. The method for providing a dynamically updated Internet panel to a remote user, as recited in claim 15, wherein the storage area is located in an Internet server.

18. The method for providing a dynamically updated Internet panel to a remote user, as recited in claim 15, wherein the portion of the syndicated content embedded in the selected Internet panel is created from a format that is one of RSS or Atom.

19. The method for providing a dynamically updated Internet panel to a remote user, as recited in claim 18, wherein RSS is a syndication format selected from a group consisting of Really Simple Syndication (RSS 2.0), Rich Site Summary (RSS 0.91, RSS 1.0), and RDF Site Summary (RSS 0.9 and 1.0).

20. The method for providing a dynamically updated Internet panel to a remote user, as recited in claim 15, wherein the portion of the syndicated content embedded in the selected Internet panel is selected from a group consisting of an interactive poll, a hyperlink, text, an image, a video file, an audio file, and poll results.

21. The method for providing a dynamically updated Internet panel to a remote user, as recited in claim 20, further including, delivering the poll results to the remote computing device when a response to the interactive poll is submitted.

22. The method for providing a dynamically updated Internet panel to a remote user, as recited in claim 15, wherein the format is selected from a group consisting of JAVASCRIPT™, VBSCRIPT™, ACTIVEX™, and FLASH™.

23. The method for providing a dynamically updated Internet panel to a remote user, as recited in claim 15, further including, the web browser prompting a syndicated content server to provide updates to the portion of the syndicated content embedded in the selected Internet panel, wherein the frequency of the prompting is between about 1 minute to about 24 hours.

24. The method for providing a dynamically updated Internet panel to a remote user, as recited in claim 15, further including, converting the portion of the syndicated content into HTML format prior to the portion of the syndicated content being embedded into the selected Internet panel.

* * * * *